April 14, 1942.  H. V. ALEXANDERSSON ET AL  2,280,019

REMOTE CONTROL APPARATUS

Filed Oct. 8, 1940 3 Sheets-Sheet 1

INVENTORS
Harald Valdemar Alexandersson
Carl-Erik Granqvist
BY
ATTORNEY

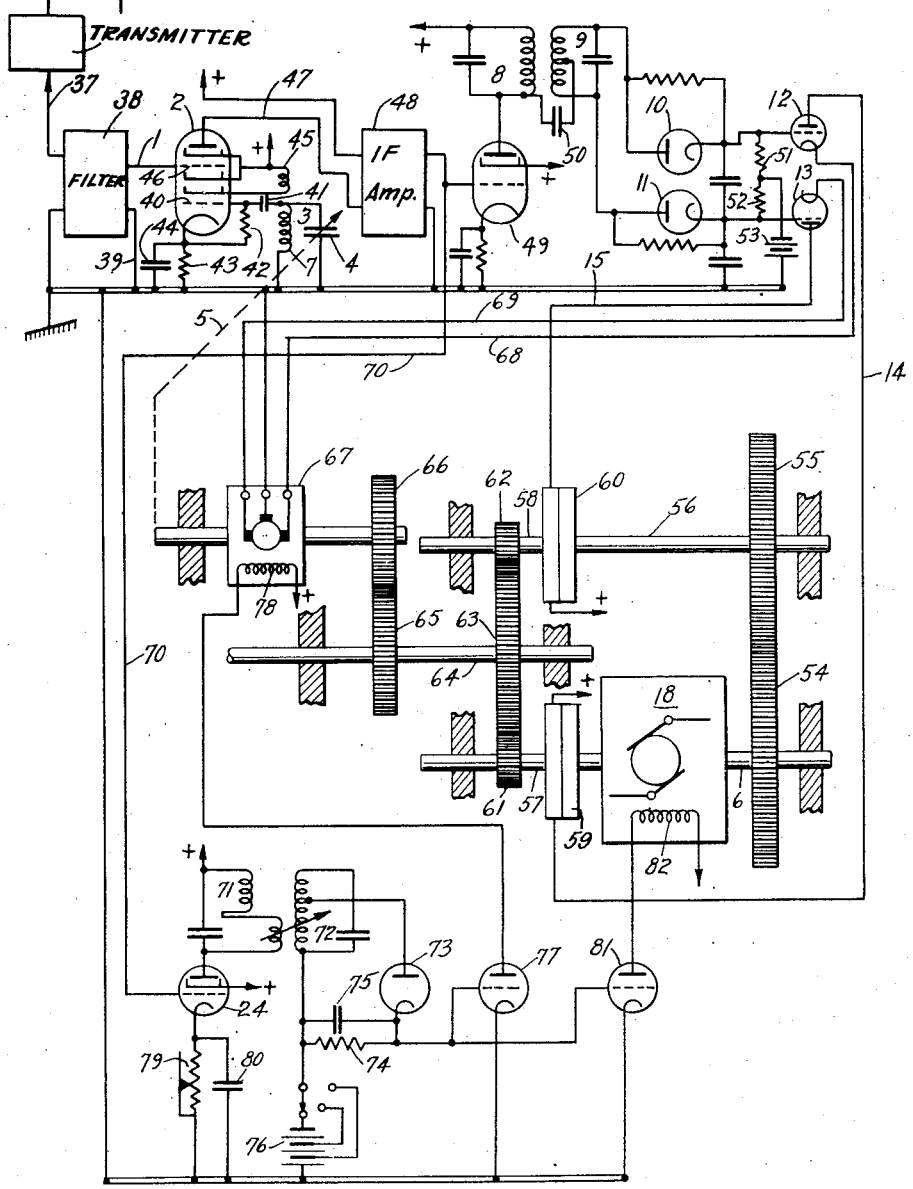

UNITED STATES PATENT OFFICE 2,280,019

REMOTE CONTROL APPARATUS

Harald Valdemar Alexandersson and Carl-Erik Granqvist, Stockholm, Sweden, assignors to Aga-Baltic Radio Aktiebolag, Stockholm, Sweden, a corporation of Sweden Application October 8, 1940, Serial No. 360,314
In Sweden September 6, 1939

12 Claims. (Cl. 172—239)

Our invention relates to remote control apparatus having a movable follow-up element, and more especially to improved means for substantially eliminating over-regulation.

There are two main types of remote control arrangements. First, those wherein the transmitter and the receiver are permanently synchronized, so that each movement of the transmitter causes a synchronous movement of the receiver. Second, those wherein the transmitter serves to produce a state of unbalance in the receiver, whereupon means in the receiver automatically function to restore the balance. A system of this type is disclosed in our copending application Serial No. 355,344, filed September 4, 1940.

While the movement of the receiver is fully synchronous in the first type of control apparatus, it is decidedly asynchronous in the second type. Due to this, relatively great lags may occur between the transmitter and the receiver, and the driving motor in the receiver may, when attempting to overcome the lag, produce damped oscillatory movements, which not only decrease the precision of the final position of rest, but also considerably increase the time necessary for the control movement.

Thus, if a relatively great amount of lag is present, the driving motor of the receiver is accelerated continuously for overcoming this lag, and it will have its greatest speed at the moment when, due to regained balance, the speed should be zero. There thus results as stated above, an over-regulation, which causes a reversal of the unbalance which results in a certain, although less over-regulation in the opposite direction, which in turn is compensated by a new control movement of the motor in the initial direction, and so on. Hunting thus occurs, which as is well known, is due to successive retardation during the over-regulation and the acceleration during the compensation thereof. The main speed of this retardation and acceleration is very low, and consequently the hunting takes a rather long time. Consequently, an aperiodic control movement, that is a movement devoid of hunting or oscillation, results in more rapid and reliable control.

It is known, quite generally, that in all kinds of control movements the aperiodic movement is obtained by a damping, which alternatively may take place by braking or by a force acting in some other manner to counteract the present direction of control in the vicinity of the end position. The present invention is based on the principle, that the braking force or other force counteracting the movement, must be dependent upon at least one of two magnitudes, namely, the momentary speed of the control motor as well as the remaining distance to the position of rest. This dependence must be of such kind that the braking or counteracting force increases as the speed of the control motor increases, and that it further increases as the distance to the position of rest decreases.

A plurality of different arrangements for obtaining this result may be used, and some preferred embodiments will be described in the following. Common to all of them is, however, that an increase of the speed of the motor and a decrease of the distance to the position of rest cooperate for creating an increased braking or counteracting force, said force being so proportioned that the positioning movement takes place with such high speed that the movement will under all conditions be aperiodic.

Further objects and advantages of our invention will be apparent from the following description, considered in connection with the accompanying drawings, which form part of this specification, and of which:

Fig. 2 shows in more detail a practical arrangement of the embodiment illustrated in Fig. 1;

Figure 1:
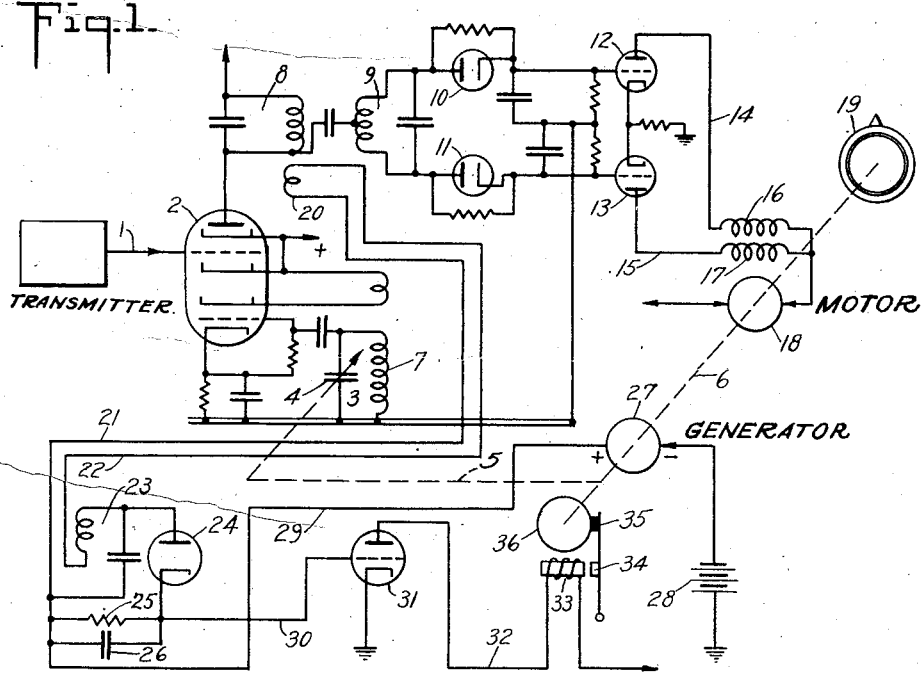
Fig. 1 shows more or less diagrammatically a simple arrangement embodying our invention.

In Fig. 1 there is illustrated a receiver, the input conductor of which is indicated by reference character 1. This conductor is in some manner coupled to a transmitter, such as by radio or the like so as to receive a radio frequency control signal, transmitted from the transmitter as set forth in our copending application above identified. This signal is modulated in a modulator tube 2 in a manner known per se with a radio frequency voltage created in the tube, the frequency of which is determined by the tuning circuit 3. The tuning circuit 3 is tunable by means of the variable condenser 4, the movable plates of which are connected by any suitable mechanical means indicated diagrammatically by 5, with the shaft 6 of the object 19 to be controlled. The condenser 4 and the coil 7 in the tuning circuit 3 are so arranged that they create a signal with a frequency which, by modulation with the frequency of the input signal over conductor 1, gives a constant beat frequency, to which the tuning circuit 8 is tuned.

Upon changes of the frequency which is transmitted to the receiver over the conductor 1, the frequency balance between the tuning frequency of circuit 8, on the one hand, and the frequency created by modulation in modulator tube 2, on the other hand, is destroyed. Due to this unbalance of the frequencies, different voltages are created in the tuning coil of circuit 8 and one half of the tuning coil of circuit 9, and in the tuning coil of circuit 8 and the other half of the tuning coil of circuit 9, respectively. These two different voltages are rectified by two rectifiers 10 and 11, the output voltages of which are amplified by the electronic tubes 12 and 13. The currents in the anode circuits of the tubes 12 and 13 thus will be different until frequency balance is again restored. These currents are conducted by conductors 14 and 15 to the field windings 16 and 17 of the motor 18, which is connected to the shaft 6.

The motor 18 will consequently be caused to rotate, thereby bringing the object 19, which is to be controlled, to the desired position and also adjusting the condenser 4 of the oscillator circuit 3, so that the frequency balance is restored.

As mentioned above the motor 18 is accelerated so that at the moment when the frequency balance is restored it is rotating at approximately its highest speed. An over-regulation will then take place because the motor 18, due to its inertia, continues the position of balance, thereby turning the condenser 4 beyond the position in which frequency balance was obtained. The voltage conditions in the two rectifiers 10 and 11 will thereby be changed, and as a consequence the resulting field direction of the field windings 16 and 17 will be reversed. This will at first have a braking action on the motor, which after having been brought to a stop, will reverse its direction of movement in order to compensate for the amount of over-regulation. During this second movement, however, an over-regulation may also take place, so that the condenser 4 will be brought to a position which it has already once passed on its way to the position of frequency balance during the first control movement. A repeated control movement will thereafter take place in the same direction as the first control movement, and perhaps this also may result in over-regulation. In this manner there is obtained an oscillating or hunting control movement. The disadvantages thereof are obviated according to the present invention in the following manner.

A coil 20 is coupled to any of the circuits conducting the modulation products, preferably to the discriminator circuits 8 and 9. The ends of the coil 20 are connected by conductors 21 and 22 to a further oscillation circuit 23, which is tuned to the same resonant frequency as the circuits 8 and 9. The circuit 23 is connected to a rectifier 24, the load resistor 25 of which is shunted by means of a condenser 26. A generator 27 is placed on the shaft 6. One terminal of the generator 27 is connected to ground through a source of bias potential 28, while the other terminal is connected by a conductor 29 with the load resistor 25 of the rectifier 24. A conductor 30 connects the opposite terminal of resistor 25 to the control grid of a direct current amplifier valve 31. The anode circuit of valve 31 is connected by a conductor 32 with the winding 33 of a magnet, the armature 34 of which is connected to a brake shoe 35, which cooperates with a braking drum 36 mounted on the control shaft 6.

The generator 27 being driven by motor 18, creates a voltage which is directly proportional to the speed of the motor 18. The rectifier 24, due to the coupling to the circuits 8 and 9 gives a voltage which reaches a maximum value at correct control position, but which decreases on each side of it according to a normal resonance curve. Approximately the resonance curve can be regarded as formed by two straight lines, and hence the voltage over the resistor 25 is approximately directly proportional to the distance from the correct control position.

The voltage from the generator 27 and the voltage over the rectifier resistor 25 are now coupled in series with each other and connected to the control grid of the direct current amplifier tube 31 in such a manner that an increased braking effect is produced by increasing voltage of the generator 27, and also by increasing voltage over the resistor 25. The source of bias 28 determines the lowest total voltage of the generator 27 and the resistor 25 which will produce a braking effect. When an impulse is first received by the receiver, the voltage over the resistor 25 can be regarded as approximately zero. The motor 18 is caused to turn, as described above and is continuously accelerated, during which the voltage at the terminals of generator 27 is increased. At a predetermined speed this voltage will be equal to the counteracting voltage from the source of voltage 28, and from this moment on a braking effect takes place, which effect increases as the speed of the motor 18, and therefore the voltage of the generator 27, increases. Consequently, before a voltage over the resistor 25 is produced, a limitation of the speed has already taken place, this limitation being adjustable by means of the source of voltage 28. When thereafter the receiver begins to approach the critical zone in the vicinity of the correct control position, an alternating voltage is fed to the rectifier 24, said voltage having a higher value, the nearer to the final control position the receiver comes. Thus, a direct current voltage is created over the resistor 25 in series with the voltage of the generator 27, and as these voltages act in the same direction, an increased braking effect will take place, so that the speed of the motor is successively braked down. The braking force is greater the nearer the receiver comes to the final tuning position, because the voltage created over the resistor 25, has its highest value at the correct tuning position. Consequently, a successive braking takes place, which reaches its maximum in the position when tuning balance obtains, in spite of the fact that the voltage from the generator 27 drops at decreasing speed.

The arrangement, described above in connection with Fig. 1, is rather schematic in order that, the principle of the invention may be easily understood. Most of the practical arrangements of the present kind require that the motor 18 develop a high torque as the final tuning position is approached. This is especially important when the object 19, which is to be controlled, has a great mass, as is the case when controlling search lights, guns and the like. In the arrangement shown in Fig. 1, the field of the two windings 16 and 17 will approach zero as the correct tuning position is approached, and the driving force will consequently decrease instead of increase. Although an arrangement as shown in Fig. 1 would be suitable to use for certain simpler purposes where the mass of piece 19 is very small, it is necessary to employ a more complicated arrangement in most instances.

An arrangement, which satisfies such practical requirements is shown in Fig. 2.

In the apparatus shown in Fig. 2 an antenna for the reception of the radio frequency signals from the transmitter is indicated by 37. This signal has, as in the arrangement according to Fig. 1 a frequency which determines the position to which the object to be controlled is to be set. A filter for the signal oscillations, suitably connected with radio frequency amplification, is indicated by 38. This filter on its output side is connected with ground by conductor 39 and is connected by conductor 1 to the electronic tube 2, which has the same function as the corresponding electronic tube in Fig. 1.

The electronic tube 2 of Fig. 2 may be assumed to be an ordinary octode valve, the inner control grid 40 of which is the oscillator grid, and which for this purpose is connected through the grid condenser 41 and the grid leak 42 to the oscillation circuit 3. For obtaining the correct cathode bias there is connected in the cathode circuit a bias resistor 43 and a condenser 44 coupled in parallel therewith. The reaction to the oscillator circuit 3 takes place by means of a reaction coil 45. The circuit 1 is connected to the outer control grid 46, due to which an intermediate frequency oscillation, formed by modulation of the incoming signal, is supplied to the output anode conductor 47. This intermediate frequency is conducted to a normal intermediate frequency amplifier 48, arranged as known in the radio art, the output side of which contains an amplifier tube 49. The tube 49 is assumed to be of normal screen grid type. The coupling of it is known per se and is accordingly not further described herein.

The discriminator arrangement is connected to the anode circuit of the valve 49. It contains a primary circuit 8 and a secondary circuit 9. The terminal of circuit 8, which is with relation to alternating currents the high voltage terminal, is connected through a condenser 50 to a tap on the coil in circuit 9, preferably a mid-point tap. By this arrangement the rectifier tube 10 is fed with a voltage which is created by vectorial combination of the voltage of circuit 8 and the voltage of the half of the circuit 9, whereas the tube 11 receives a voltage which is the vectorial combination of the voltage of circuit 8 and the voltage of the other half of the circuit 9 as set forth in our copending application above referred to. The two voltages from circuit 9 thus act in series with the voltage of the circuit 8 in such a way that, in one of the rectifier tubes 10 and 11 the voltages add, whereas in the other tube the voltages are opposed. It is known that at resonance the voltage of the circuit 8 is displaced 90° in phase in relation to the voltage of the circuit 9. The vector diagram for the alternating current fed to the rectifier 10, and for the alternating current fed to the rectifier 11, will therefore be symmetrical and congruent figures. Due to this, at resonance the direct current voltages created over the load resistor 51 of the rectifier 10 and over the load resistor 52 of the rectifier 11 are equal. At resonance derangements, however, the phase angle between the circuit 8 and the circuit 9 is increased or decreased, and as a consequence the symmetry between the two vector diagrams is destroyed. Hence, one of the voltages fed to rectifier 10 and rectifier 11, respectively, is decreased whereas the other is increased, and the voltage drop over one of the resistors 51 and 52 becomes less, whereas the voltage drop over the other resistor becomes greater. The voltages over the resistors 51 and 52 are connected to the grids of the direct current amplifier tubes 12 and 13. The anode circuits 14 and 15 of these tubes consequently receive currents which are stronger when the voltage over the resistor in question, 51 or 52, is greater, but weaker when the voltage over the resistor in question is lower. A source of bias 53 is arranged in the grid circuit and so proportioned that a current flows in the anode circuit in question as soon as a voltage difference over the resistors 51 and 52 is present.

The driving motor is as above indicated by 18. Its shaft 6 is by means of gears 54 and 55 connected to a second shaft 56, which thus rotates in the opposite direction to shaft 6 but at the same speed. The shafts 6 and 56 are connected to the shafts 57 and 58, respectively, by means of two magnet clutches 59 and 60, which are preferably made as slip clutches. The shafts 57 and 58 carry pinions 61 and 62, respectively, which mesh with a common gear 63, arranged on the control shaft 64. By the above described arrangement the shaft 64, independently of the constant direction of rotation of the motor 18, may be rotated in either direction, depending on which of the magnet clutches 59 or 60 has been energized.

A tachometric generator 67 is driven by the control shaft 64 through gears 65 and 66. The generator 67 is arranged to create two equal voltages, counteracting each other, which are fed over conductors 68 and 69 to the direct current amplifier valves 12 and 13 as cathode biases.

The output side of the intermediate frequency amplifier 48 is connected by means of the conductor 70 with the control grid of a tube 24, the anode circuit of which includes the circuit 71, tuned to the intermediate frequency. The circuit 71 is preferably coupled to the secondary circuit 72 by a variable coupling device, which is in turn connected to the rectifier 73 with the load resistor 74, the last named being shunted for alternating current with the condenser 75. The load resistor 74 is connected in series with a source of bias 76, which is preferably variable, to the control grid of a direct current amplifier tube 77. The anode circuit of the tube 77 contains the field winding 78 of tachometric generator 67.

In the cathode circuit of the tube 24 is arranged, a variable control resistance 79, shunted for alternating current with a condenser 80, for a purpose to be hereinafter described.

For a purpose, which also will be further described below, the input circuit of a second tube 81 is connected in parallel with the valve 77. The anode circuit of the tube 81 includes the field-winding 82 of the motor 18.

The operation of the above described arrangement for remote control is similar to that of Fig. 1. Hence only the operation of controlling the arrangements for the control movement and the speed of the control motor respectively require further description. The motor 18 rotates continuously. When an unbalance of voltage is created over the resistors 51 and 52, due to a difference between the tuning frequency of the circuits 8 and 9 and the intermediate frequency created in the modulator 2, one of the magnet clutches 59 or 60 is energized. The current through the magnet clutch is, however, not only influenced by the relation between the voltages created over the load resistors 51 and 52, but also by the voltage drop across the cathode biases of the tubes 12 and 13, which are controlled by the operation of the tachometric generator 67. The excitation of this and hence the magnitude of the created voltages, however, depends upon the speed at which the control shaft 64 rotates, and also upon the excitation of the winding 78. The last named is in turn, due to the resonance curve of the tuned circuit 71 and 72, depending upon the displacement of the instantaneous position of the control shaft from the position which corresponds to the actual transmitter frequency. If the displacement between these two positions is great, the voltage over the resonance circuit 71 and 72 is obviously small and the excitation in the winding 78 is very small. Consequently, a very low voltage is created in the tachometric generator, and practically only the voltages over the resistors 51 and 52 will determine which magnet clutch will be energized.

Due to its connection in the cathode circuit of the tubes 12 and 13, the voltage in the tachometric generator counteracts the voltage from the resistors 51 and 52. At sufficiently high speed of the control shaft the voltage from the tachometric generator 67 will increase to such an extent that both of the tubes 12 and 13 are blocked, and consequently both of the magnet clutches will be released and the control shaft will stop. It is thus possible, by dimensioning of the source of bias 76, which is connected in the grid circuit of the valve 77, the anode circuit of which feeds the exciting winding 78 of the generator 67, to determine the highest allowable speed of control.

In the following it may be assumed that the movement of control is such that the grid of the tube 12 receives positive voltage, and consequently the magnet clutch 59 is energized. Due to the movement of the motor 18, the shaft 64 turns the controlled object to the desired position, as determined by the frequency of the transmitter, but at the same time due to the connection 5 between the shaft 64 and the condenser 4, a control of the local oscillator frequency in the receiver takes place, so that the intermediate frequency approaches the tuning frequency of the circuits 8, 9, 71 and 72. Due to the smaller frequency error in the circuits 8 and 9, the voltage difference over the resistances 51 and 52 is decreased. At the same time, however, due to the decrease of frequency difference relative to the circuits 71 and 72, the direct current voltage drop through the resistance 74 increases, and the tube 77 receives an increasingly stronger anode current. Consequently, the generator 67 creates an increasingly higher voltage, which is no longer in proportion only to the speed at which the shaft 64 turns. This voltage counteracts, as stated above, the voltage over the resistors 51 and 52, and in some place in the vicinity of the correct tuning position the anode current of the valve 12 will decrease sufficiently so that the magnet clutch 59 is released. At the same time, however, the anode current of the valve 13 will increase, and consequently the magnet clutch 60 will be energized for a short period. The magnet clutch is, however as stated above, made as slip coupling, and for this reason it will only produce a braking effect on the motor 18 and the control shaft 64. A pre-braking effect has been obtained due to the fact that the field of the winding 82 of the motor 18 already has been increased substantially, inasmuch as this winding is fed by current from the electronic tube 81, which also is dependent upon the selectivity in the circuits 71 and 72.

The energizing of clutch 60 having reduced the speed sufficiently so that the generator 67 no longer produces any substantial voltage, the voltage drop through the resistances 51 and 52 will again play the decisive role, and as a consequence hereof the magnet clutch 60 is released, and the magnet clutch 59 is again energized. It is, however, assumed that during this time the shaft 64 has brought the condenser 4 to a tuning position which coincides so closely with the final position, that it is on or in the vicinity of the top point of the resonance curve for the circuits 71 and 72. The anode current through the tube 81 is now very strong, and as a consequence of the stronger excitation of the winding 82, the motor 18 will very slowly drive the control shaft by means of the magnet clutch 59 to its final position, in which the magnet clutch is released due to the balance of voltage obtaining between the resistors 51 and 52.

From the above it will be apparent that the braking force of the magnet clutch 59 in the assumed example is dependent upon the anode current produced in the tube 77. This is in its turn dependent upon the voltage drop through the resistance 74, which is again dependent upon the width of the resonance curve for the circuits 71 and 72. This width can be controlled by change of the coupling between the circuits, as earlier mentioned. This coupling is therefore used in order to fix the suitable point of time for the beginning of the braking effect, whereas the resistance 79 is used for the control of a suitable force of braking.

Figure 3:
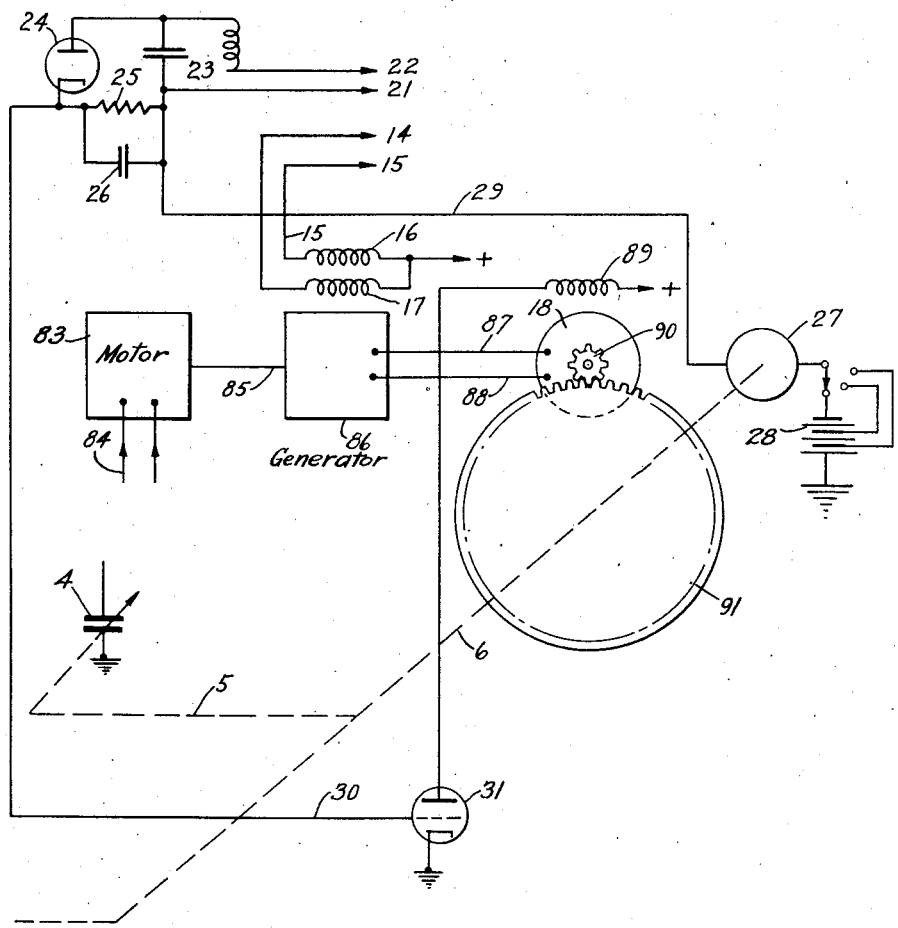
Fig. 3 shows another embodiment of my invention.

Fig. 3 shows a modified embodiment of the invention in the same simplified manner, as used in Fig. 1. Corresponding parts have been indicated by the same reference characters. In Fig. 3, however, such parts have been omitted as are identical with the corresponding parts of Fig. 1, whereas only the same indication has been used for the conductors between the parts in question.

The conductors 21 and 22 are connected to the same circuit 23, which is in series with the load resistor 25 connected to the rectifier valve 24. The load resistor 25 is shunted by a condenser 26 for alternating current. The voltage, developed over the resistor 25, is thus here, as well as in the arrangement according to Fig. 1, dependent upon the displacement between the momentary position of the receiver and the position of the receiver which corresponds to the frequency of the transmitter. This voltage is coupled in series with the voltage from a tachometric generator 27 and a bias voltage 28. The three voltages, coupled in series, are connected between ground and the grid of a direct current amplifying tube 31, in the anode circuit of which the field winding of the driving motor 18 is connected.

The driving motor is arranged in what is called a Ward-Leonard coupling. The primary driving motor is indicated by 83. It obtains its voltage from mains indicated by 84. The motor 83 drives an auxiliary generator 86 through the shaft 85, which is magnetized by means of windings corresponding to the two field windings 16 and 17 of Fig. 1. These windings are thus connected to the conductors 14 and 15. The voltage from generator 86 is by means of two conductors 87 and 88 transmitted to the control motor 18, the field of which is indicated by 89. Through gears 90 and 91 the control motor drives the common control shaft 6 on which also the tachometric generator 27 is mounted.

The arrangement functions in the following manner:

The motor 83 runs continuously and drives the generator 86 through the shaft 85. The generator creates no voltage in its position of rest, as neither the field windings 16 nor 17 have any current. However, when a frequency unbalance is produced by a change in the transmitter frequency, there will be produced, in the manner described in connection with Fig. 1, a voltage over one of the conductors 14 or 15 namely, the conductor which produces rotation of the control motor 18 in the proper direction to overcome the frequency unbalance. The voltage thus transmitted over the conductors 87 and 88 from the generator 86 causes the motor 18 to turn in such a direction as to compensate for the lag. The shafts 6 and 5 also turn the condenser 4 in the oscillator circuit of the receiver so that the frequency unbalance is diminished and finally is eliminated.

The speed control of the motor 18 takes place in such a manner that an increasing field strength of the motor 18 reduces the speed, and the driving force is increased at the same time, and hence an increased precision in the control is obtained. It is understood that if the field 89 is sufficiently strong, very weak currents through the armature winding of the motor 18 cause a rotation of this motor sufficient to effect a control with high precision.

The field is obtained from the winding 89, which is coupled in series with the anode circuit of the tube 31. The control grid of this valve is connected to three sources of voltage coupled in series, namely, the resistance 25, over which a voltage is created dependent upon the distance between the momentary position of the receiver and the position which the receiver should take, also the generator 27 which produces a voltage proportional to the speed of the control motor 18, and finally a fixed but adjustable source of voltage 28. The resistance 25 is coupled in such a way in the circuit of the electronic tube 31, that an increasing voltage drop over this resistance increases the field of the motor 18. This is obtained by tuning the circuit 23 to the frequency that the modulator has at frequency balance with the signal transmitted from the transmitter. Consequently the voltage indicated by the resonance curve of the circuit 23 is developed over the rectifier 24, and the voltage drop through the resistor 25 is a direct measure of the rate of resonance. The closer to resonance, the higher will be the voltage over the resistor 25, and the stronger will be the anode current through the electronic valve 31, said current serving as magnetising current for the motor 18. The generator 27 is so connected that upon increasing speed of the motor 18, the field from the winding 89 also increases. Hence, an effective limitation of speed is obtained. The motor 18 can never reach a higher speed than that which is determined by the voltage of the generator 27, less the voltage from the source of voltage 28.

Figure 4:
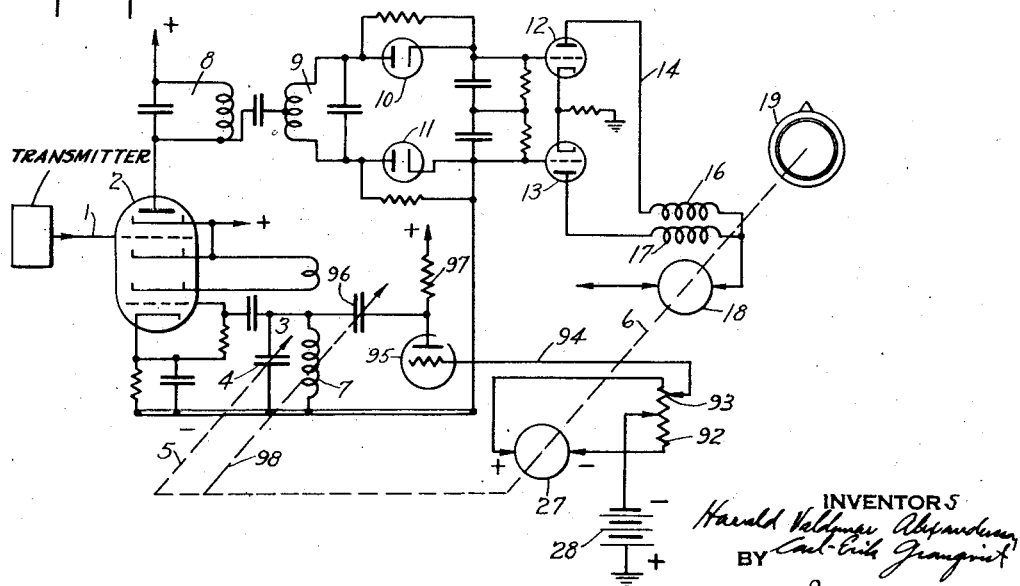
Fig. 4 shows a further embodiment.

As is evident from the above, the source of voltage 28 may be controlled in such a manner that the maximum control speed is determined thereby. In Fig. 4 a further modification of the arrangement according to Fig. 1 is shown, and similar parts have been indicated by the same reference numerals. The difference is, however, that the tachometric generator 27 has been arranged to influence the apparatus in a manner differing from that shown in Fig. 1.

Thus the output voltage of the tachometric generator 27 is closed through a controllable resistance 92, the mid-point of which is connected to the source of voltage 28, and which is provided with an additional, preferably adjustable tap 93. The tap 93 is connected through the conductor 94 with the grid in an electronic tube 95. This electronic tube, with reference to alternating currents, is coupled in series with the condenser 96 and in parallel with the coil 7 and the condenser 4 of the circuit 3, whereas the electronic tube obtains its direct current from a series resistor 97. The condenser 96 is preferably of rather small capacity in relation to the condenser 4, but arranged adjustable with the same shaft as the condenser 4 in a manner, which is shown by the broken line 98.

The arrangement functions in the following manner:

When a signal is received over the conductor 1, in the manner described above, an intermediate frequency signal is created, which more or less exactly coincides with the discriminator frequency of the circuits 8 and 9. The oscillator frequency is created in the circuit 3, and it consequently has a magnitude which is determined in the apparatus, shown in Fig. 1, by the condenser 4 and the coil 7. In the arrangement shown in Fig. 4, however, one further small capacity is coupled in parallel, namely, the effective capacity of the condenser 96 and the electronic tube 95. Due to its purely resistive coupling the inner path of the electronic tube 95 serves, however, substantially only as a series resistor to the condenser 96, whereby the resulting capacity of this condenser in the circuit 3 may be continuously adjusted.

The capacity adjustment takes place through the changing of the inner resistance of the electronic valve 95 by varying grid bias. The grid bias is obtained from the resistance 92, and consequently it is proportional to the voltage obtained from the tachometric generator 27.

Consequently, when the motor 18, in the manner described above, accelerates the generator 27, the latter will generate a voltage which is transformed in the voltage divider 92 to a suitable value and is fed to the valve 95 as grid bias. A successive displacement of the tuning frequency independently of the displacement which takes place due to the rotation of the shafts 6, 5 and 98, will therefore take place due to the changed coupling of the condenser 96 to the remaining parts of the circuit.

The tachometric generator 27 is separately magnetised, and its direction of voltage is therefore dependent upon the direction of rotation of the shaft 6. The direction of the voltage is therefore so chosen that by the action of the electronic tube 95 a side tuning of the oscillator circuit 3 takes place in such a direction that, upon increasing speed of the shaft 6, the intermediate frequency created in the modulator tube 2 approaches the frequency on which the discriminator circuits 8 and 9 are tuned, with a higher speed than that which corresponds to the rotation of the shaft 6. Consequently, before the shaft 6 has reached its position of rest, the circuit 3 will be detuned to such an extent that frequency balance is obtained, and the motor 18 consequently stops.

Due to its inertia, the motor 18 stops relatively slowly and it will therefore continue to rotate after the ostensible balance of frequency has occurred. During this period of time, however, the field direction has been reversed due to coils 16 and 17, so that the motor works as a regenerative generator and itself causes the braking of the shaft 6. Simultaneously with this braking effect, however, the voltage from the tachometric generator 27 is decreased and the frequency unbalance created in the oscillator circuit in an artificial way, is slowly compensated, so that the braking action from the motor 18, when it turns as a regenerative generator is successively decreased to such an extent that it finally stops exactly in the correct position.

Further, in the arrangement shown in Fig. 4, an action is obtained which brakes or otherwise counteracts the movement, and which is dependent upon the displacement between the momentary position of the control shaft and the position that the control shaft should have at the actual frequency of the transmitter, and also is dependent on the speed with which the control movement takes place. The voltage of the generator 27 is a direct measure of the speed, and this voltage is fed to the grid of the tube 95 in order to provide a frequency displacement. With wide displacement between the position of the receiver and the position corresponding to the transmitter frequency, the electronic tube 95 and the condenser 96 coupled to it serve to decrease the apparent displacement and thereby the balance between the coils 16 and 17 is upset in such a manner that the motor obtains a decreased driving force. At a certain position, which can be adjusted by means of the source of bias 28 and the tap 93, however, the artificial displacement of the frequency due to the electronic tube 95 and the condenser 96 will correspond to the actual frequency displacement, and consequently from this moment on a braking effect will be produced by regenerative action of the motor 18.

Although in the above described embodiments of the invention, the state of unbalance, by which the motor of the receiver is put in action or, after compensation of the error, the motor of the receiver is brought to a stop, is assumed to depend upon the difference between the frequency transmitted from the transmitter and the frequency to which the receiver is tuned, which in turn is dependent upon the position of the controlled object. It is obvious that the invention is not limited to this special type of remote control arrangement, but it can with equal advantage be used in other kinds of remote control arrangements in which the state of unbalance is caused between other magnitudes than electric frequencies. It is also obvious that the four embodiments of the invention described above, are only to be regarded as examples chosen for purposes of illustration and that the invention can be used in many different forms.

Remote control arrangements of the kind described here have very great advantages in that the receiver can readily be caused to move according to other functions than the linear function in relation to the movement of the transmitter. Further, a plurality of transmitter magnitudes may be caused to influence the transmitted frequency in such a manner that the control position of the receiver will be an arbitrary function of all of these transmitter magnitudes. These advantages result in the fact that it is possible to use the arrangements of the described common type not only for accurate control at great distance but also for control at short distances. Thus, the term "remote control" is to be understood as applying to all kinds of control, except direct manual control, regardless of the distance between the transmitter and the receiver.

What is claimed is:

1. A remote control apparatus comprising an object to be controlled, a receiver for oscillations of different frequencies, variable tuning means, drive means responsive to variations in the received frequency to shift said tuning means and said object by an amount dependent upon said frequency variations, a resonant circuit tuned to a frequency which determines the position of rest of said tuning means and connected to be fed by oscillations of a frequency dependent upon the instantaneous position of said tuning means, and means controlled by the energy in said resonant circuit to exert a braking effect on said drive means which increases to a maximum as the position of resonance is reached, whereby over-control and hunting are avoided.

2. A remote control apparatus comprising an object to be controlled, a receiver for oscillations of different frequencies, said receiver having an oscillator connected to modulate the received frequency to produce a beat frequency, tuning means for said oscillator, drive means responsive to variations in said beat frequency produced by corresponding variations in the received frequency to shift said tuning means and said object to a position suited to restore said beat frequency to a predetermined value, a resonant circuit tuned to said predetermined beat frequency and connected to be fed by the actual instantaneous beat frequency, and means controlled by the energy in said resonant circuit to exert a braking effect on said drive means which increases to a maximum as the actual beat frequency reaches said predetermined beat frequency to which said resonant circuit is tuned, whereby over-control and hunting are avoided.

3. In a remote control apparatus as set forth in claim 1, a rectifier connected to be actuated by the energy in said resonant circuit, a load resistor connected to carry the current rectified by said rectifier to thereby produce a voltage drop dependent upon the energy in said resonant circuit, and means actuating said braking means in accordance with the voltage drop across said load resistor.

4. In a remote control apparatus as set forth in claim 1, a rectifier connected to be actuated by the energy in said resonant circuit, a load resistor connected to carry the current rectified by said rectifier to thereby produce a voltage drop dependent upon the energy in said resonant circuit, means actuating said braking means in accordance with the voltage drop across said load resistor, and an adjustable bias voltage source connected in series with said load resistor to control the point at which the braking becomes effective.

5. In a remote control apparatus as set forth in claim 1, a rectifier connected to be actuated by the energy in said resonant circuit, a load resistor connected to carry the current rectified by said rectifier to thereby produce a voltage drop dependent upon the energy in said resonant circuit, an electronic amplifier valve connected to be actuated in accordance with said voltage drop, said valve having an output circuit connected to control said braking means.

6. A remote control apparatus as set forth in claim 1, in which said drive means comprises a continuously operating motor, reversible drive means including a pair of clutches connected to be driven by said motor in a direction dependent upon the operation of the respective clutches, and means responsive to the direction of variation in the received frequency to actuate a selected clutch suited to shift said tuning means in a direction to compensate for said frequency variation.

7. A remote control apparatus as set forth in claim 1, in which the driving means comprises a motor having a field winding which is connected to be energized in accordance with the energy in said resonant circuit, and a continuously driven generator feeding said motor, said generator having opposed field windings connected to be energized in accordance with the direction and amount of variation in the received frequency.

8. A remote control apparatus comprising an object to be controlled, a receiver for oscillations of different frequencies, variable tuning means, drive means responsive to variations in the received frequency to shift said tuning means and said object by an amount dependent upon said frequency variation, means controlled in accordance with the displacement of said tuning means from its position of rest to exert a braking effect on said drive means which increases to a maximum as the position of rest is reached, and means responsive to the speed of operation of said drive means to exert an additional braking effect thereon which is proportional to the excess of said speed over a predetermined minimum speed, whereby the tuning means is caused to rapidly approach its position of rest and is brought to a stop thereon without hunting.

9. A remote control apparatus as set forth in claim 8, in which said last means comprises a direct current generator mounted to be driven by said drive means and connected to deliver a voltage which is dependent upon the speed of operation thereof, and in which said braking means is actuated in accordance with said voltage to thereby produce a braking effect which is proportional to the speed of operation of said drive means.

10. A remote control apparatus as set forth in claim 8, in which said last means comprises a generator connected to be driven by said drive means and to deliver a voltage dependent upon the speed and direction of operation thereof, said generator having a field winding energized in accordance with the variation in received frequency whereby the voltage delivered thereby is determined by the speed of operation of said drive means and also by said frequency variation, and said braking means is actuated in accordance with the voltage delivered by said generator.

11. A remote control apparatus as set forth in claim 8, in which the drive means comprises a continuously operating motor and a reversible drive coupling connected to said motor to actuate said tuning means, said coupling including a pair of clutches adapted to selectively control the direction of operation of said tuning means, a generator connected to be driven with said tuning means and to be energized in accordance with the instantaneous displacement of the tuning means from its new position of rest corresponding to the change in received frequency, whereby a voltage is produced by said generator dependent upon both the speed of operation of said tuning means and the remaining distance to be travelled thereby, and means selectively actuating said clutches in accordance with the combined effect of the variation in received frequency and of the voltage produced by said generator.

12. A remote control apparatus comprising an object to be controlled, a receiver for oscillations of different frequencies, variable tuning means, drive means responsive to variations in the received frequency to shift said tuning means and said object by an amount dependent upon said frequency variation, and means responsive to both the instantaneous speed of said drive means and the remaining distance which said tuning means must travel to its new position of rest corresponding to the variation in received frequency to exert a braking effect on said drive means which increases as the speed of operation thereof increases and increases as the remaining distance to be travelled decreases, whereby the tuning means is caused to rapidly approach its position of rest and is brought to a stop thereon without hunting.

HARALD VALDEMAR ALEXANDERSSON.
CARL-ERIK GRANQVIST.

CERTIFICATE OF CORRECTION.

Patent No. 2,280,019. April 14, 1942.

HARALD VALDEMAR ALEXANDERSSON, ET AL.

It is hereby certified that error appears in the printed specification of the above numbered patent requiring correction as follows: Page 2, first column, line 31, after "continues" insert --past--; and that the said Letters Patent should be read with this correction therein that the same may conform to the record of the case in the Patent Office.

Signed and sealed this 13th day of October, A. D. 1942.

(Seal)

Henry Van Arsdale,
Acting Commissioner of Patents.